United States Patent
Yu et al.

(10) Patent No.: US 6,820,992 B2
(45) Date of Patent: Nov. 23, 2004

(54) BACKLIGHT MODULE DEVICE

(75) Inventors: Hong-Tien Yu, Bade (TW);
Cheng-Min Liao, Taichung (TW); Yao Tung Wang, Chiai (TW)

(73) Assignee: Chunghwa Picture Tubes, Ltd., Taipei (TW)

(*) Notice: Subject to any disclaimer, the term of this patent is extended or adjusted under 35 U.S.C. 154(b) by 109 days.

(21) Appl. No.: 10/242,716

(22) Filed: Sep. 13, 2002

(65) Prior Publication Data
US 2003/0072146 A1 Apr. 17, 2003

(30) Foreign Application Priority Data
Sep. 14, 2001 (TW) .................................. 90215933 U

(51) Int. Cl.[7] .............................................. F21V 7/04
(52) U.S. Cl. .............................. 362/31; 362/26; 349/65; 385/146
(58) Field of Search ................ 362/26, 31; 349/58, 349/65; 385/146

(56) References Cited

U.S. PATENT DOCUMENTS 3,994,564 A * 11/1976 Somogyi .................... 349/65
5,988,827 A * 11/1999 Lee ............................ 362/31

* cited by examiner

Primary Examiner—Stephen F Husar
(74) Attorney, Agent, or Firm—Bacon & Thomas, PLLC

(57) ABSTRACT

A backlight module for a flat panel display includes a light guide plate having at least one projecting lug on the peripheral edge of at least one side thereof, the projecting lug being connected to a linear peripheral edge of the light guide plate with a top front portion thereof and connected to the other linear peripheral edge on the same side of the light guide plate with a bottom end portion thereof; and a frame which surrounds at least a part of the peripheral edge of the light guide plate and includes an opening to closely receive the projecting lug of the light guide plate; wherein the linear peripheral edges respectively conducted to the top front portion and the bottom end portion of the projecting lug on the same side of the light guide plate are disposed in a non-collinear manner among themselves.

9 Claims, 2 Drawing Sheets

BACKLIGHT MODULE DEVICE

BACKGROUND OF THE INVENTION

1. Field of the Invention

The present invention relates to a backlight module for flat panel display devices, and more particularly, to a backlight module for liquid crystal display devices (LCDs).

2. Description of Related Art

The backlight module of a LCD device tends to be damaged in delivery or by an inadvertent impact or drop. In this case, for example, the light guide plate of the backlight module impinges on the light source such as lamp contained in the backlight module when impact or drop occurs. As such, the light source (lamp) of the backlight module slips down, breaks or cracks so that the duration of use or the production yield of the LCD device is decreased. Therefore, to ensure the quality of the display products, some manufacturers have had the product gone through glide tests and impact tests for the LCD device as well as the backlight module thereof before delivery of the products. However, significant improvement in reducing the impact stress forces and damage to the backlight module, e.g., crack or breakage of the light guide plate or the light source, has not yet been provided.

Therefore, it is desirable to provide an improved backlight module to mitigate and/or obviate the aforementioned problems.

SUMMARY OF THE INVENTION

The primary object of the present invention is to provide a backlight module for a LCD which increases the durability against any impact, homogeneously distributes the impact stress forces, reduces the impact force and reinforces the light guide plate.

Another object of the present invention is to provide a light guide plate for a LCD which increases the durability against any impact, homogeneously distributes the impact stress forces, reduces the impact force and reinforces the light guide plate.

To achieve the objects, a backlight module for a flat panel display according to the present invention comprises a light guide plate having at least one projecting lug on the peripheral edge of at least one side thereof, said projecting lug being connected to a linear peripheral edge of the light guide plate at a top front portion thereof and connected to the other linear peripheral edge on the same side of the light guide plate at a bottom end portion thereof; and a frame which surrounds at least a part of the peripheral edge of the light guide plate and includes an opening to closely receive the projecting lug of the light guide plate; wherein the linear peripheral edges at the top front portion of the projecting lug and the bottom end portion of the projecting lug on the same side of the light guide plate are disposed in a non-collinear manner among themselves.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
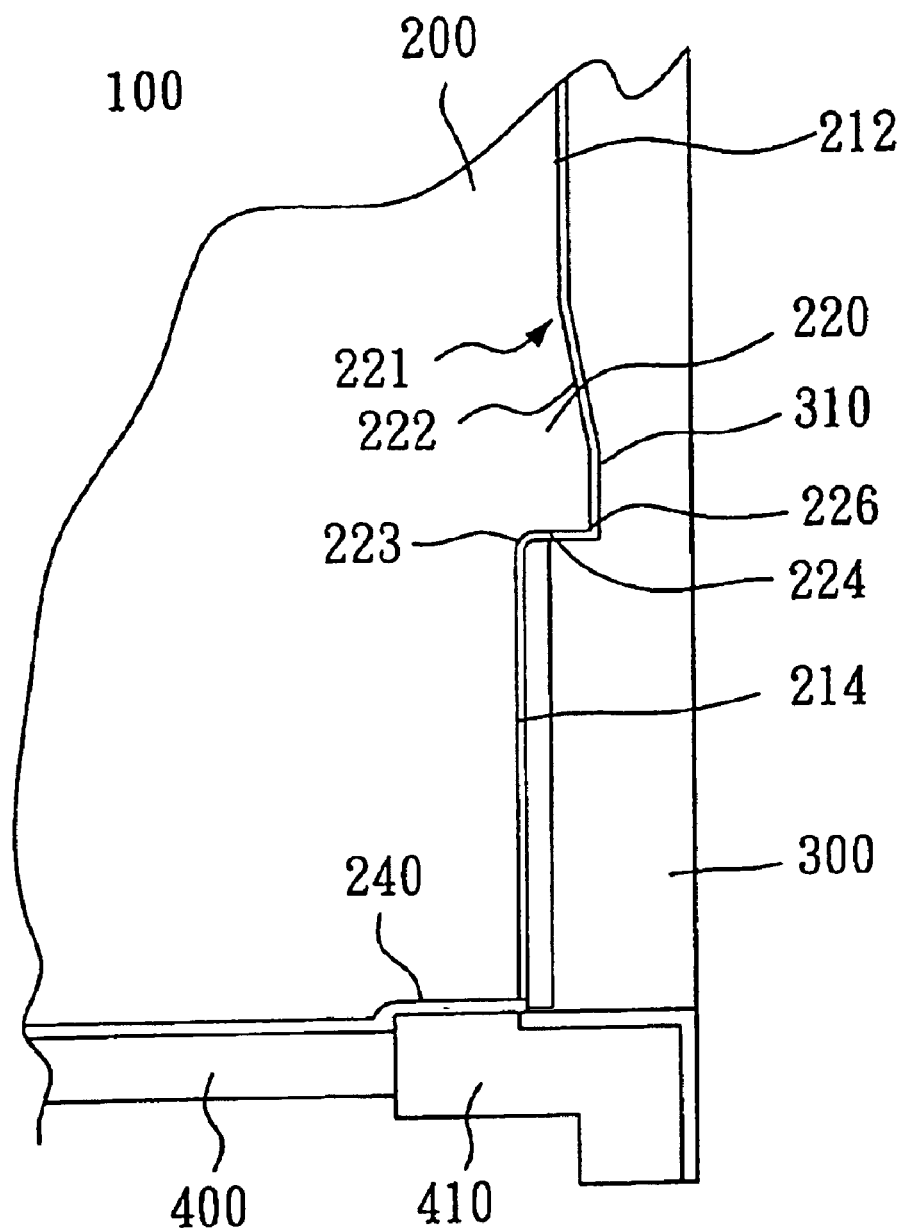
FIG. 1 is a top view of the backlight module according to the present invention.

The position of the projecting lug of the light guide plate of the backlight module of the present invention on the light guide plate is not limited, and preferably, the projecting lug of the backlight module is mounted on one side of the light guide plate without facing light source. This means that the projecting lug of the backlight module is mounted on the non-directly-facing-light source side of the light guide plate, that is, any side other than the side directly facing a light source in cooperation with the light guide plate. Preferably, the projecting lug is disposed on the two non-directly-facing-light source sides of the light guide plate or the sides of the light guide plate without facing light source symmetrically to buffer the impact force as hit. Moreover, at least one side of the light guide plate without facing light source or the directly-facing-light source side of the light guide plate of the present invention is preferable to have a cave at the peripheral edge of the directly-facing-light source side to adequately receive a lamp holder so as to avoid any crack or breakage of the lamp because the peripheral edge of the light guide plate smashes into the conjunction, which is the most fragile part of the light source, between the lamp holder (power cable socket) of the light source (the lamp) and the lamp when hit caused by falling down onto the ground, for example. The front and back portions of the projecting lug of the backlight module of the present invention, the linear peripheral edge of the light guide plate connected to the top front portion of the projecting lug on the light guide plate side and the other linear peripheral edge connected to the bottom end portion of the projecting lug on the same side of the light guide plate are not limited, and preferably, the linear peripheral edge of the light guide plate connected to the top front portion of the projecting lug and the other linear peripheral edge of the light guide plate on the same side of the light guide plate connected to the bottom end portion of the projecting lug are arranged in a non-collinear manner such that the contact area between the light guide plate and its corresponding frame is enlarged and the anti-force of the light guide plate of the backlight module on the side longitudinal to the light source is increased. The shape of the projecting lug of the light guide plate of the backlight module of the present invention is not limited, and preferably, the shape of the projecting lug is trapezoid or triangle, and more preferably, the length of the peripheral edge connected to the top front portion of the projecting lug is longer than the peripheral edge connected to the bottom end portion of the projecting lug. The backlight module of the present invention may further comprise an assembly member such as optical film, reflecting plate and light source. The backlight module of the present invention further comprises a frame which may enclose in part or in whole the peripheral edge of the light guide plate. Preferably, at least the guide light panel is enclosed. Of course, the backlight module can selectively includes other components for a conventional backlight module such as diffuser films, prism films, or reflectors to enhance or improve the function.

To illustrate the present invention, exemplary embodiment of a backlight module for flat panel display will now be described with reference to the drawing in which:

FIG. 1 is a top view of the backlight module 100 according to the present invention. The backlight module 100 comprises a light guide plate 200 and a frame 300 corresponding to the light guide plate 200. The peripheral edge of the right and left sides of the light guide plate 200 has a projecting lug 220 in the shape of a trapezoid. The projecting lug 220 has a top front portion 221 connected to a linear peripheral edge 212 of the light guide plate 200 and a bottom end portion 223 connected to a linear peripheral edge 214 of the light guide plate 200. The linear peripheral edge 212 of the light guide plate 200 and the other linear peripheral edge 214 of the light guide plate 200 are arranged in a non-collinear manner as viewed from the top. Such a non-collinear design can increase the width of the bottom portion of the projecting lug 200. Therefore, the contact area between the light guide plate 200 and the frame 300 is enlarged. Accordingly, the impact force is decreased when impact occurs, and also, the possibility of breaking the light guide plate 200 or the light source such as CCFL (Cold Cathode Fluorescent Lamp) is reduced. The projecting lug 220 is shaped as a trapezoid. The projecting lug 220 has a slant surface 222 formed at the connection of the top front portion 221 thereof and the peripheral edge 212 of the light guide plate. Also, the projecting lug 220 has a bottom surface 224 formed at the connection of the bottom end portion 223 thereof and the peripheral edge 214 of the light guide plate, the bottom surface being close to a vertical plane to the peripheral edge 214 of the light guide plate 200. Further, the projecting lug 220 has a tip portion 226 at the utmost distance from the peripheral edge 214 of the light guide plate 200. The tip portion 226 protrudes beyond the light guide plate 200, but not penetrates through the frame 300 corresponding to the light guide plate 200.

The bottom of the light guide plate 200 may optionally dispose a cave 240 corresponding to a lamp holder 410 of a light source 400. The cave 240 is positioned at the bottom end of the light guide plate 200, and caves in the light guide plate 200 to enclose the lamp holder 410 of the light source of the display device without substantially contacting the lamp holder 410.

Figure 2:
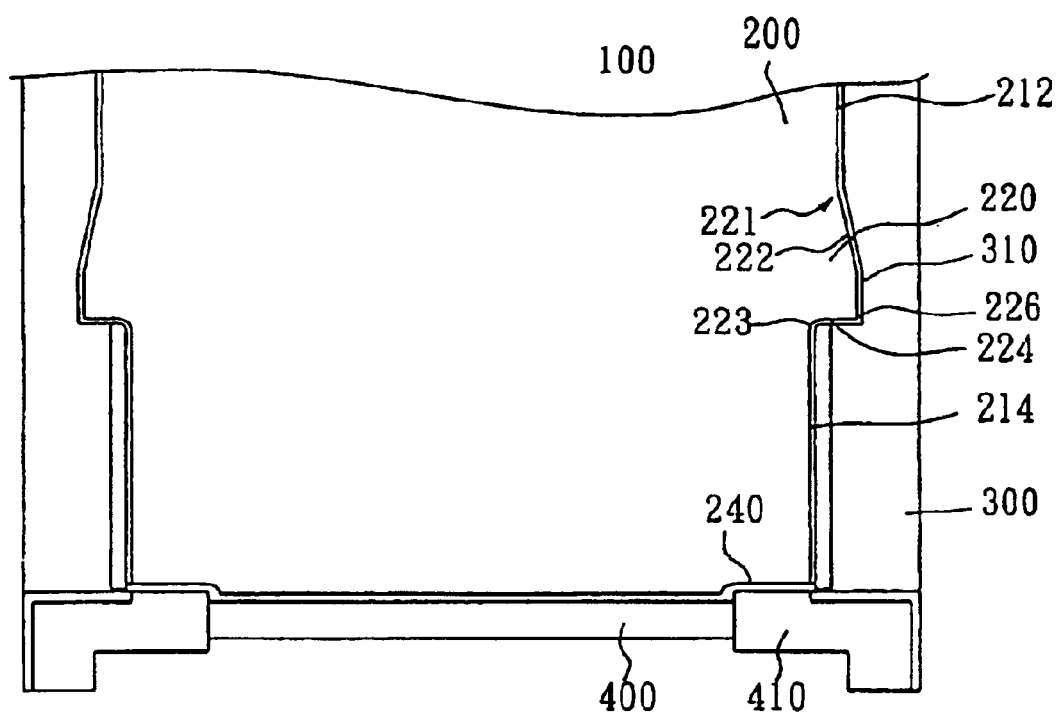
FIG. 2 is a top view of the backlight module with projection lugs disposed on both sides of the light guide plate, according to a preferred embodiment of the present invention.

The light guide plate 200 of the present invention can enlarge its contact area with the frame 300 by the projecting lug 220 mounted on the both sides of the light guide plate 200. According to the principle of σ=P/A, such a design can significantly reduce the impact force of the plate module when impact or any downward movement resulting therefrom exists. The movement of the light guide plate 200 caused by impact will not result in any crack on the fragile part of the light source (lamp) 400 of the display. Furthermore, since the linear peripheral edge 212 of the light guide plate 200, connected the top front portion 221 of the projecting lug 220, and the other linear peripheral edge 214 of the light guide plate 200, connected to the bottom end portion 223 of the projecting lug 220, are arranged in a non-collinear manner as viewed from the top, it increases the durability of the light guide plate 200 against stress. The projecting lugs 220 are disposed on both sides of the light guide plate symmetrically (as shown in FIG. 2), which will average the impact force when impact of plate module occurs. Further, the optional design of setting up the cave can reduce the possibility of a direct hit of the light guide plate onto the light source (lamp), especially to the most fragile part of the lamp (i.e., the lamp holder). This will significantly increase the durability to impact for the backlight module of a display and the plate module.

Although the present invention has been explained in relation to its preferred embodiment, it is to be understood that many other possible modifications and variations can be made without departing from the spirit and scope of the invention as hereinafter claimed.

What is claimed is:

1. A backlight module for a flat panel display, comprising:
   a light guide plate having at least a projecting lug on the peripheral edge of at least one side thereof, a top front portion of said projecting lug being connected to a linear peripheral edge of said light guide plate and a bottom end portion of said projecting lug being connected to another linear peripheral edge on the same side of the light guide plate; and
   a frame surrounding at least a part of the peripheral edge of said light guide plate and including an opening to closely receive said projecting lug of said light guide plate;
   wherein said linear peripheral edge connected to the top front portion of the projecting lug and the other linear peripheral edge connected to the bottom end portion of the connecting lug are non-collinear.

2. The backlight module as claimed in claim 1, wherein said projecting lug is mounted on a side of the light guide plate that does not face a light source.

3. The backlight module as claimed in claim 1, wherein said projecting lugs are symmetrically mounted on sides of the light guide plate that do not face a light source.

4. The backlight module as claimed in claim 1, wherein a light source is provided corresponding to said backlight module, and at least one side of the light guide plate facing the light source has cave to receive a lamp holder of said light source.

5. The backlight module as claimed in claim 1, wherein said projecting lug has a trapezoidal shape.

6. The backlight module as claimed in claim 1, further comprising a light source.

7. A light guide plate comprising at least a projecting lug on the peripheral edge of at least one side thereof, a top front portion of said projecting lug being connected to a linear peripheral edge of said light guide plate and a bottom end portion of said projecting lug being connected to another linear peripheral edge on the same side of the light guide plate
   wherein said linear peripheral edge connected to the top front portion of the projecting lug and the other linear peripheral edge connected to the bottom end portion of the connecting lug are non-collinear.

8. The light guide plate as claimed in claim 7, wherein a light source is provided corresponding to said backlight module, and at least one side of the light guide plate facing the light source has a cave to receive a lamp holder of said light source.

9. The light guide plate as claimed in claim 7, wherein said projecting lug has a trapezoidal shape.

* * * * *